United States Patent [19]
Ng et al.

[11] Patent Number: 5,648,628
[45] Date of Patent: Jul. 15, 1997

[54] CARTRIDGE SUPPORTED KARAOKE DEVICE

[76] Inventors: Tao Fei S. Ng, 34714 Siward Dr., Fremont, Calif. 94555; Kong Wing R. Chow, 2923 Creek Point Dr., San Jose, Calif. 95133; Cheuk-Wai C. Lau, 40642 Encanto Way, Fremont, Calif. 94539

[21] Appl. No.: 536,084

[22] Filed: Sep. 29, 1995

[51] Int. Cl.⁶ ............................ G09B 15/04; G10H 1/36
[52] U.S. Cl. .................. 84/610; 84/645; 84/477 R; 434/307 A
[58] Field of Search .................. 84/601, 602, 609–614, 84/634–638, 645, 477 R, 478, DIG. 12; 434/307 A; 369/1–12, 47–51

[56] References Cited

U.S. PATENT DOCUMENTS

| | | | |
|---|---|---|---|
| 4,992,886 | 2/1991 | Klappert | 358/342 |
| 5,127,303 | 7/1992 | Tsumura et al. | 84/609 |
| 5,131,311 | 7/1992 | Murakami et al. | 84/609 |
| 5,294,746 | 3/1994 | Mihoji | 84/603 |
| 5,408,686 | 4/1995 | Mankovitz | 369/47 X |
| 5,454,723 | 10/1995 | Horii | 84/477 R X |
| 5,465,240 | 11/1995 | Mankovitz | 369/1 |

*Primary Examiner*—Stanley J. Witkowski
*Attorney, Agent, or Firm*—Robert Samuel Smith

[57] ABSTRACT

A karaoke device for playing music stored on replaceable solid state memory cartridges with a console having controls for enabling the user to select the musical pieces to be played. The device features an LCD screen for displaying the title and lyrics of the song wherein the words are highlighted as the music is played. The device is connectable to a microphone so that the users voice may be mixed in with the music. A console of the device has controls for allowing the user to select the title of the selected song. A keyboard is provided on a console enabling the user to modify characteristics such as pitch and tempo of the song.

15 Claims, 14 Drawing Sheets

CARTRIDGE SUPPORTED KARAOKE DEVICE

FIELD OF THE INVENTION

This invention relates to devices that combine karaoke music and lyrics with a voice and particularly to a portable device wherein the karaoke music and lyrics are supplied by a changeable cartridge.

PRIOR ART AND INFORMATION DISCLOSURE

A growing segment of the public derives great pleasure from singing along with recorded music guided by lyrics displayed by a display device. Such devices for playing music and displaying lyrics are referenced to as karaoke musical reproduction devices. In earlier karaoke devices, music and lyrics were recorded on tapes and disks using digital-audio techniques. However, demand for more songs and greater quality of reproduction has grown, methods and devices have appeared in which music and accompanying lyrics are stored as digital data in a standard format known as MIDI. The driving force for this new approach to storing and retrieving musical data has been the need to miniaturize and reduce the cost of the equipment.

In digital-audio recording, the musical waveform is stored as a digitally expressed succession of waveforms. In MIDI technology, the musical data is stored as a series of instructions in memory according to which a controller (microprocessor) instructs a synthesizer to generate a signal having the tonal characteristics (pitch, timbre, etc) of the original recorded musical notes. The sequencer software directing the CPU has the capability to modify the instructions to the synthesizer to modify the tonal characteristics so as to produce musical effects that were not contained in the original sound.

Reproduction of musical sound in MIDI format is much easier for standard musical instruments than for the human voice because of the differences in timbre. U.S. Pat. No. 5,294,746 to Tsumura et al discloses a karaoke system in which a backing chorus is broken down and stored in segments and stored in memory for subsequent mixing with musical data in MIDI format.

U.S. Pat. No. 4992,551 to Klappert et al discloses means for storing data in MIDI format on an audio compact disc without affecting the digitized sound stored in the main channel.

U.S. Pat. No. 5,127,303 to Tsumara discloses a karaoke device featuring two microprocessors for receipt and transfer of data between a magneto optic disc and synthesizer thereby reducing the reproduction processing time load.

OBJECTS

The trend in developing Karaoke systems has been toward devices that are very complex, and require large memory in spite of the inroads in reducing required storage memory by MIDI. The trend has therefore been to target a market where large systems can be accomodated such as places of public entertainment—restaurants, bars, night clubs, etc. Such machines are generally too expensive and require too much space for individual ownership. It is therefore an object of this invention to provide a karaoke device that is readily portable such as the user might wish to take to private parties, picnics, entertainment around a barbeque pit, on long family auto trips etc.

Another consideration appealing to the individual consumer is to have a large repertoire of music from which he may choose and yet not have the expense or inconvenience of caring for a large disk drive that is incompatible with compactness and portability. It is therefore another object to be able to make selections of musical pieces from a large library of selections wherein the library is deposited in a remote safe location when the user is taking his karaoke device with him for an afternoon or evening of entertainment.

It is yet another consideration for the individual consumer that new compositions appear in the music world every few weeks or so and it is highly desireable to be able to add these new pieces, a few at a time, as soon as they appear on the market.

Another object is to provide a device that is very useful as a teaching tool to teach a user or a class how to sing. It would be especially useful to a teacher to have a device that can be carried into a classroom from which selected music can be played and not only the song can be selected, but the key (pitch) and tempo can be selected to fit the vocal range (such as of young children) that is suitable for the student. As an aid in this application, it is contemplated that the device be provided with an output jack attachable to a speaker or a recorder so that the teacher can adjust the key to suit the student (such as to prevent straining the voice) and to be able to playback the student's voice to illustrate teaching objectives such as voice control, etc.

SUMMARY

This invention is directed toward a karaoke system which features, as its storage medium of musical data, a removable solid state memory cartridge. Lyrics accompanying the selectable musical rendition are presented on a liquid crystal display. The solid state memory cartridge used in place of the disk drive and the liquid crystal display used in place of the video display ensures low power consumption compared to present state of the art Karaoke systems so that the Karaoke system of the present invention is battery operated and therefore is housed in a portable configuration. Software for all Karaoke functions including accompaniment, synchronized lyric display, echo, chorus effects, key and tempo change, are contained in ROM accessible by a microprocessor. Software in ROM is used by the microprocessor to translate the musical data in MIDI format in the replaceable cartridge to a format acceptable to the music synthesizer section. A RAM is provided for temporary storage for the microprocessor during the translation process. From the music synthesizer, the synthesized music is mixed with audio input from a microphone and sent to a speaker. The title is first displayed on a LCD display and is changed by the user selecting the title from a button on the console. The LCD displays the song lyrics simultaneously with the music. The device has a console with the LCD display, a speaker (or speaker jack), microphone (or microphone jack) and control buttons for selecting operations such as the musical piece, displaying the title of the songs and changing the key.

DESCRIPTION OF A BEST MODE

Figure 1:
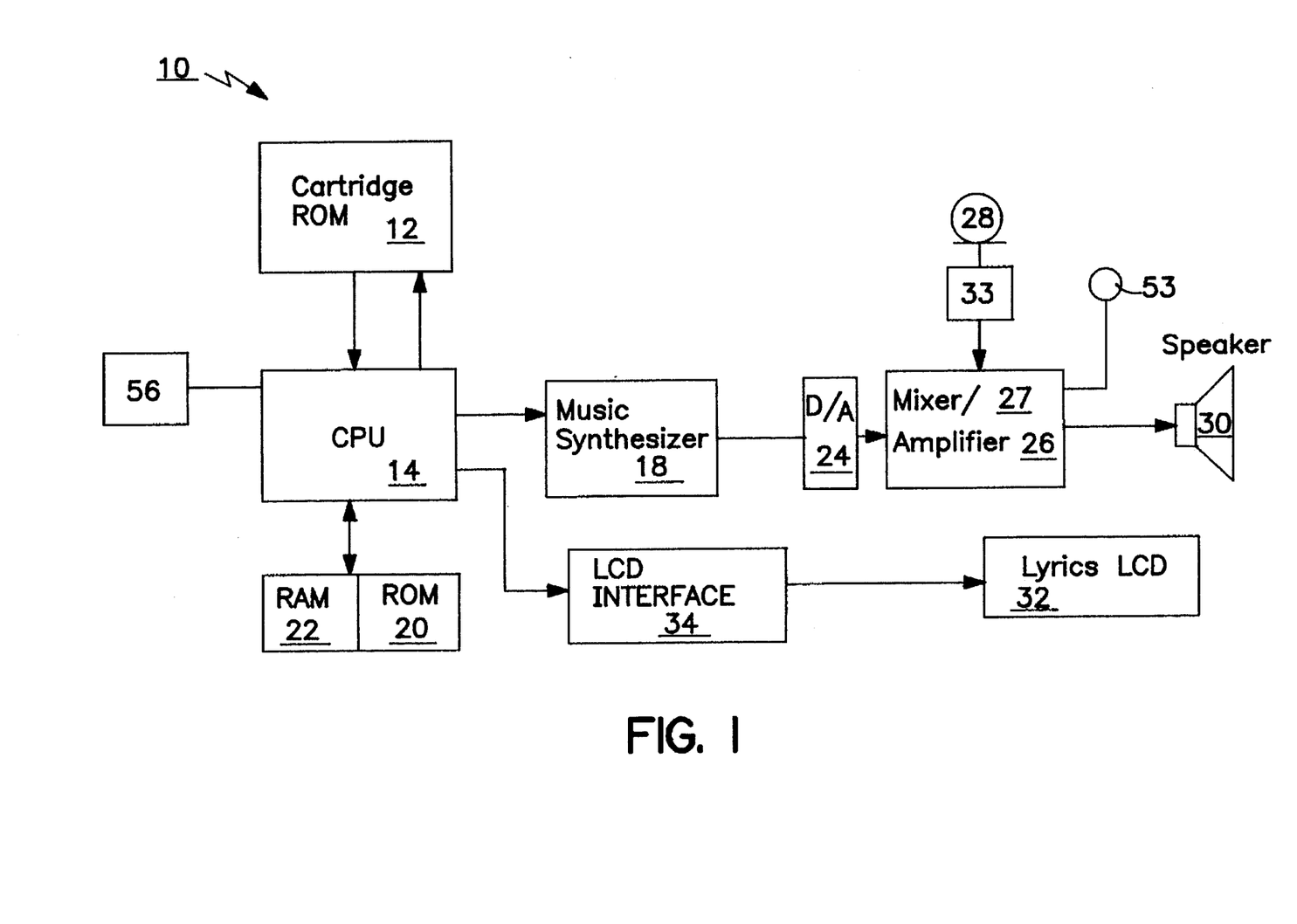
FIG. 1 shows a block diagram of the Karaoke system of this invention.

Turning now to a discussion of the drawings, FIG. 1 is a block diagram showing the components of the invention 10 and the directions the signals go to the speaker. There is shown a changeable ROM cartridge 12 which contains musical and lyrical data in MIDI format. The ROM cartridge 12 provides data representing a succession of musical events to central processor 14 in response to a sequencer sending signals from CPU 14. Subroutines stored in ROM 20 are used by CPU 14 to transform the MIDI format of the data to a second format that is acceptable to the music synthesizer 18. The microprocessor 14 uses RAM 22 as temporary storage while performing the transforming operation.

A complete guide to writing subroutines used in the transformation process is found in "The Musician's Guide to Midi" by C. Braut, published by Sybex, Alameda, Calif., 1993, ISBN 0-7821-1285-4.

The music synthesizer 18 generates a digital-audio wave form of the music event. The digital wave form is then sent through D/A converter 24 to amplifier 26 mixer 27. The user inputs a voice signal through microphone 28 to microphone-amplifier 33 and then to mixer 27 amplifier 26 and the combined signal is output to speaker 30. A jack 53 for an audio recorder is shown.

The microprocessor 14 also separates lyric data from the music data supplied from ROM cartridge 12 and directs the lyric data through LCD interfacing circuitry 34 to the LCD display 32.

Key controls 56 are shown for controlling characteristics such as pitch and tempo.

Figure 2:
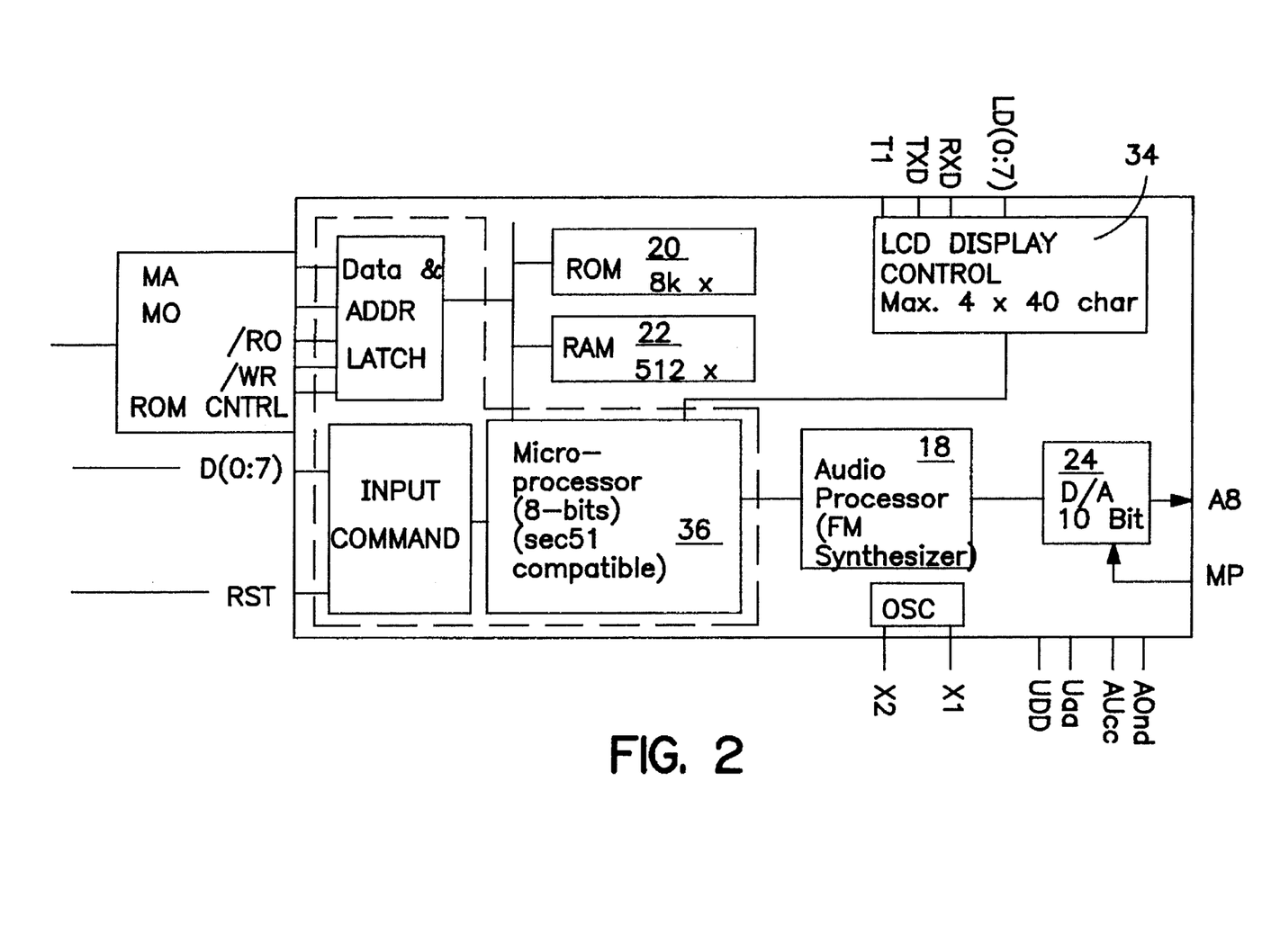
FIG. 2 shows a block diagram of board (or chip) mounted components of FIG. 1.

FIG. 2 shows board mounted components which perform the control functions of the system. The CPU 14 includes microprocessor 36, input command section 37 and data and address latch section 39. Microprocessor 36 is connected to control buttons 56 on a console discussed in connection with FIG. 3. The microprocessor 36 is also connected by data bus to 8 k×8 bit ROM 20 and 512×8 bit RAM. 22, by bus to LCD display driver 34 and by bus to music synthesizer 18. (audio processor). Digital audio data from synthesizer 18 is transmitted to D/A converter 24. Oscillator 46 is shown for delivering timing pulses to a sequencer in microprocessor 36. Connections $V_{dd}$ for a 12 volt battery are shown. In one embodiment these components are mounted on a single printed circuit board and in another embodiment the components are mounted on a single chip, both of these embodiments representing economical methods for constructing the invention and conferring compactness on construction of the invention so that the device is readily portable.

Figure 3:
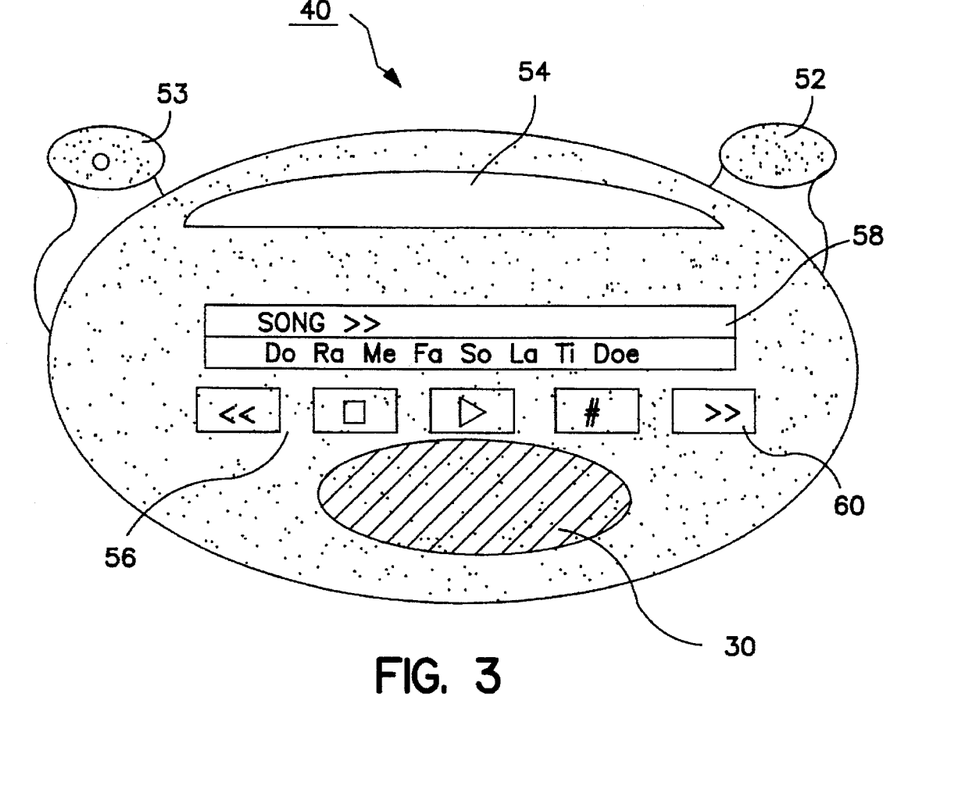
FIG. 3 shows the console with LCD screen, title screen and musical selection controls.

FIG. 3 shows the console 40 with the speaker 30 and jack 52 for microphone 28. The console 40 also has the LCD indicia display screen 54 which initially displays the title of the song and then displays lyrics as the music is played enabling the user to read the lyrics and sing as the song is played. The row of control buttons 56 are shown which are controls for a number of functions. These functions include:

1. Down key for selecting a song to be played and whose title is displayed on title screen 58,
2. Up key for selecting a song to be played and whose title is displayed on title screen 58;
3. Pause key.
4. Stop key
5. Play key
6. Tempo change
7. Musical key change.

In one embodiment a jack 53 is provided that can be connected with either a speaker or audio recorder.

Figure 4:
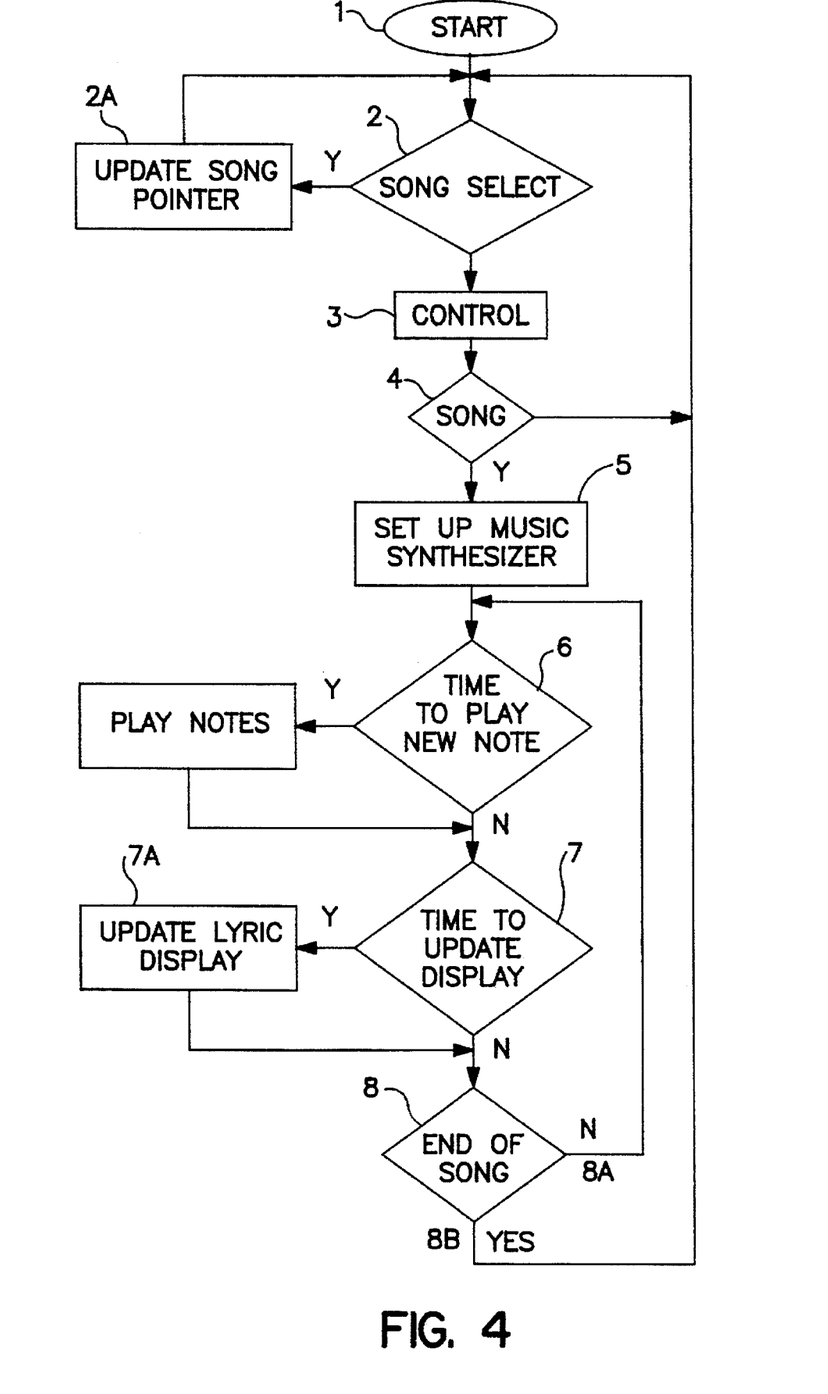
FIG. 4 Shows the flow chart for selecting and transmitting a song on the Karaoke system.

FIG. 4 shows a flow chart for presenting a musical event listing the steps in presenting a musical event.

At the START, the user turns on the system and inserts the cartridge;

In step 2, the user makes a decision: Is song selected? yes or no.

In step 2A if no, user uses the song pointer to select the song and goes back to step 2.

In step 3, he selects pitch and tempo.

In step 4 he starts the song;

In step 5 a note in MIDI format is transmitted in succession to the microprocessor which translates each note to a format acceptable by the music synthesizer;

In step 6, the note is played and appropriate lyrics displayed.

In step 7, do lyrics need updating?

In step 7A, update lyrics if needed.

In step 8, is end of song signal detected?

In step 8A, if end is not detected, return to step 6;

In step 8B, if end is detected, end song return to step 2.

Figure 5:
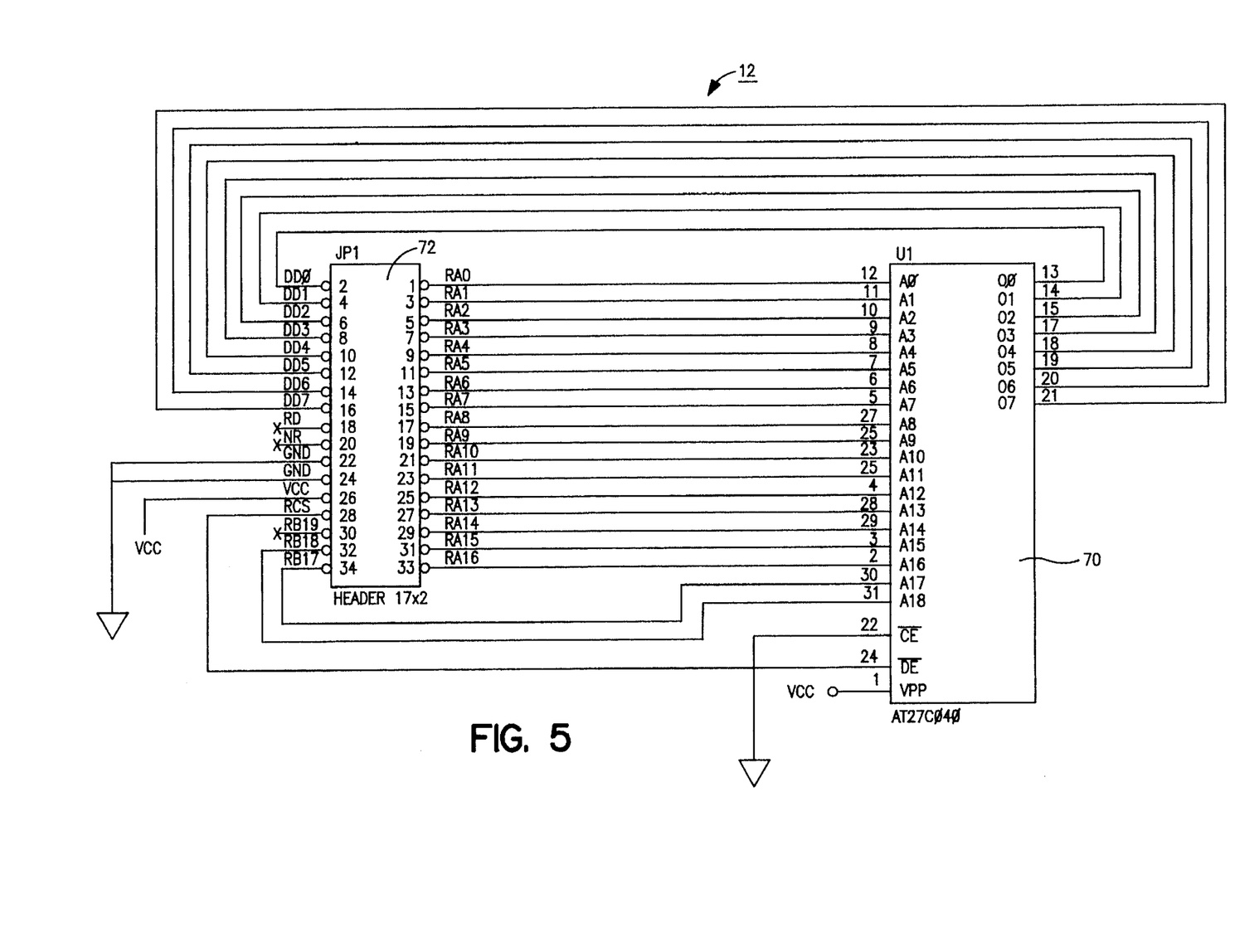
FIG. 5 shows the connection of the cartridge to the karaoke system.
Figure 6A:
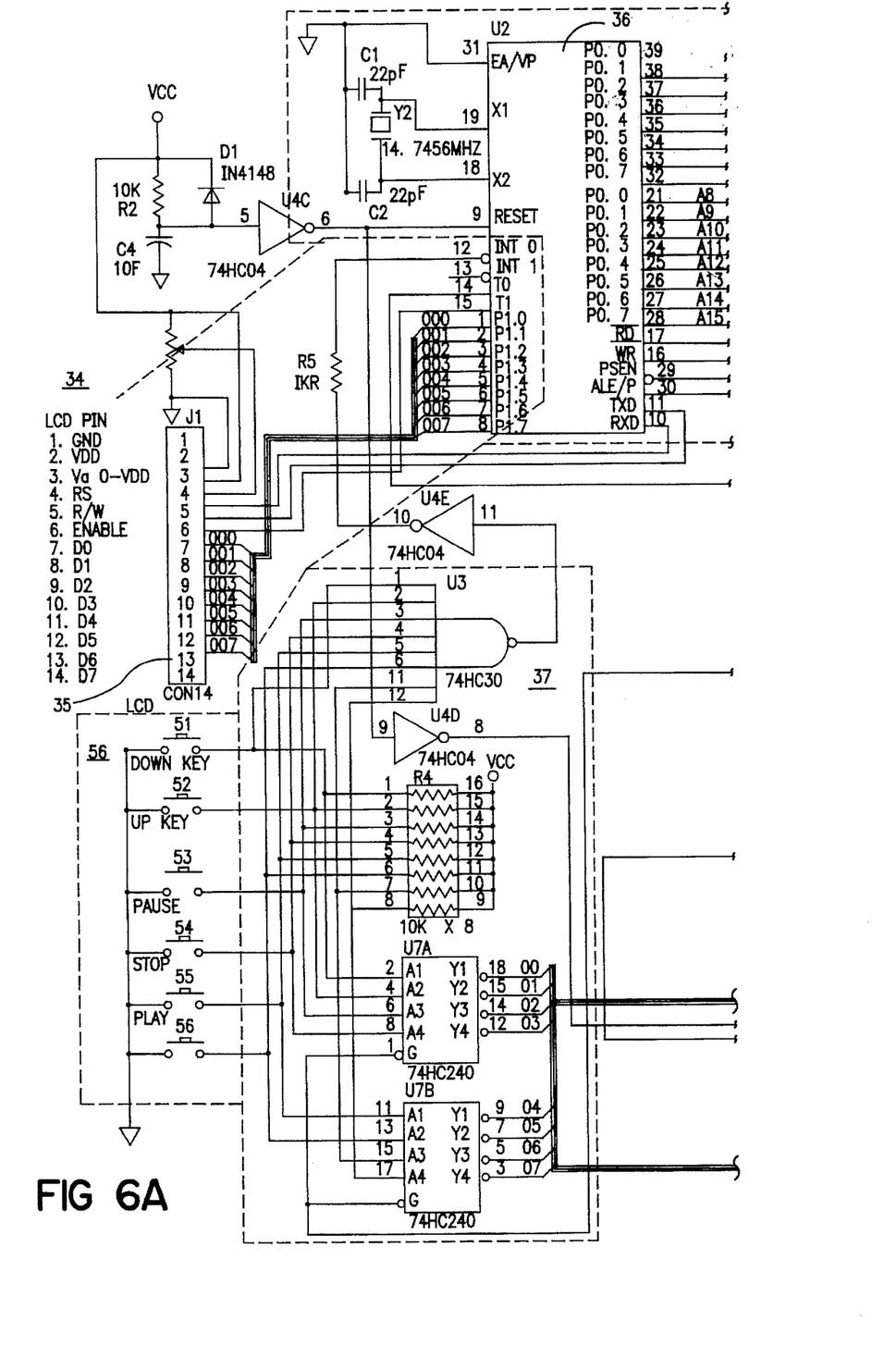
FIG. 6 is a circuit diagram of the CPU, RAM, ROM and key control sections.
Figure 6B:
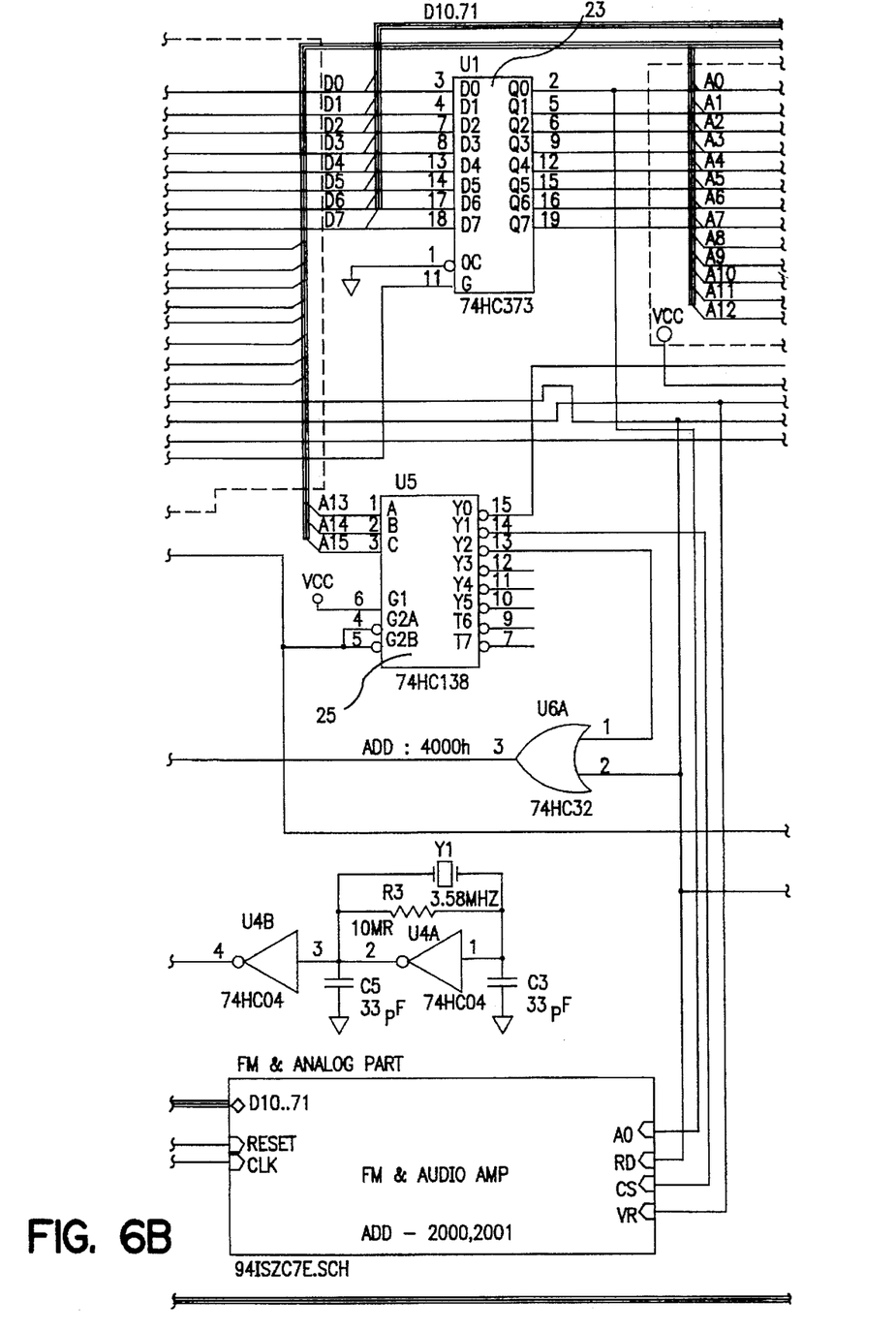
Figure 6C:
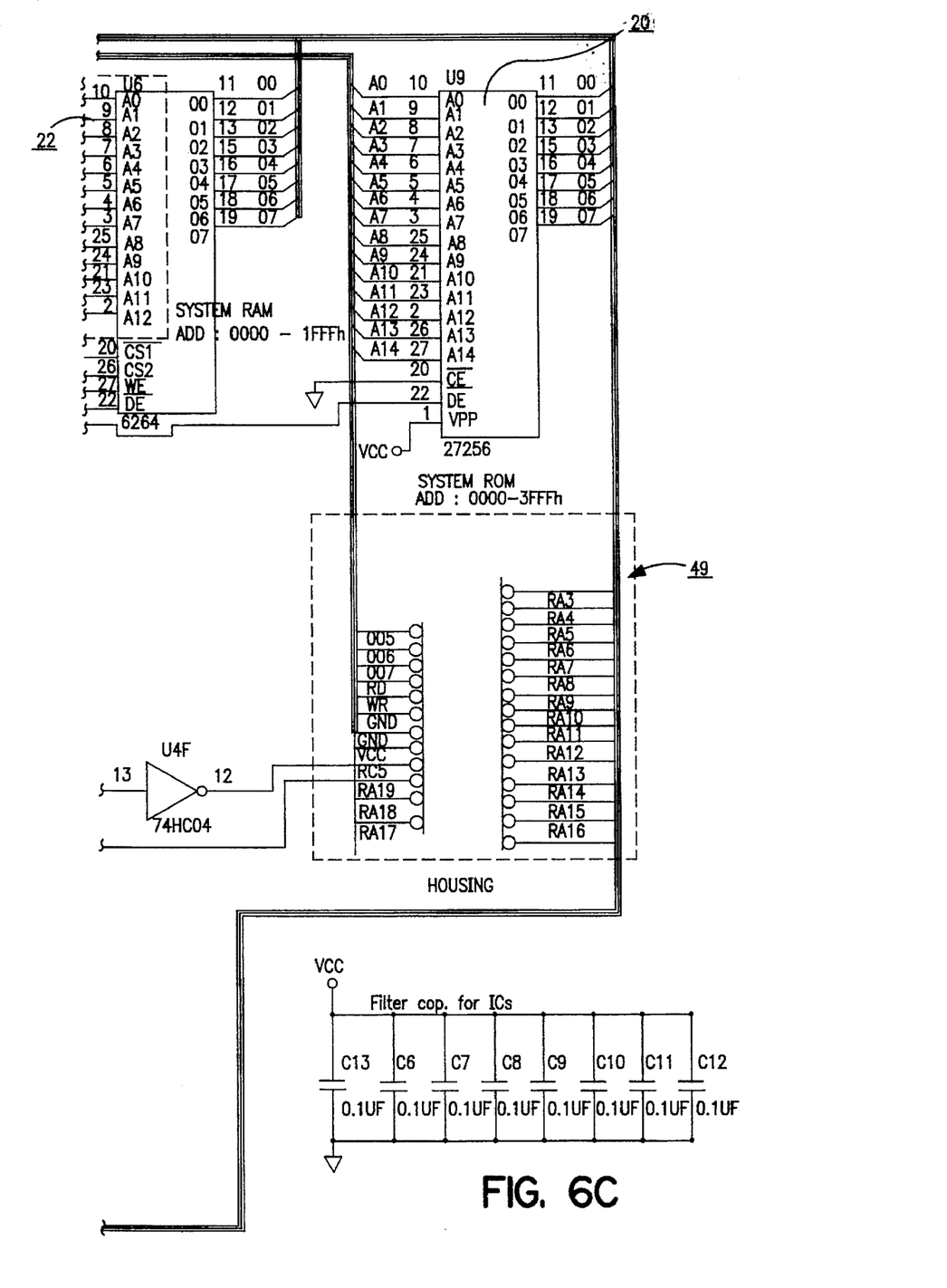
Figure 7A:
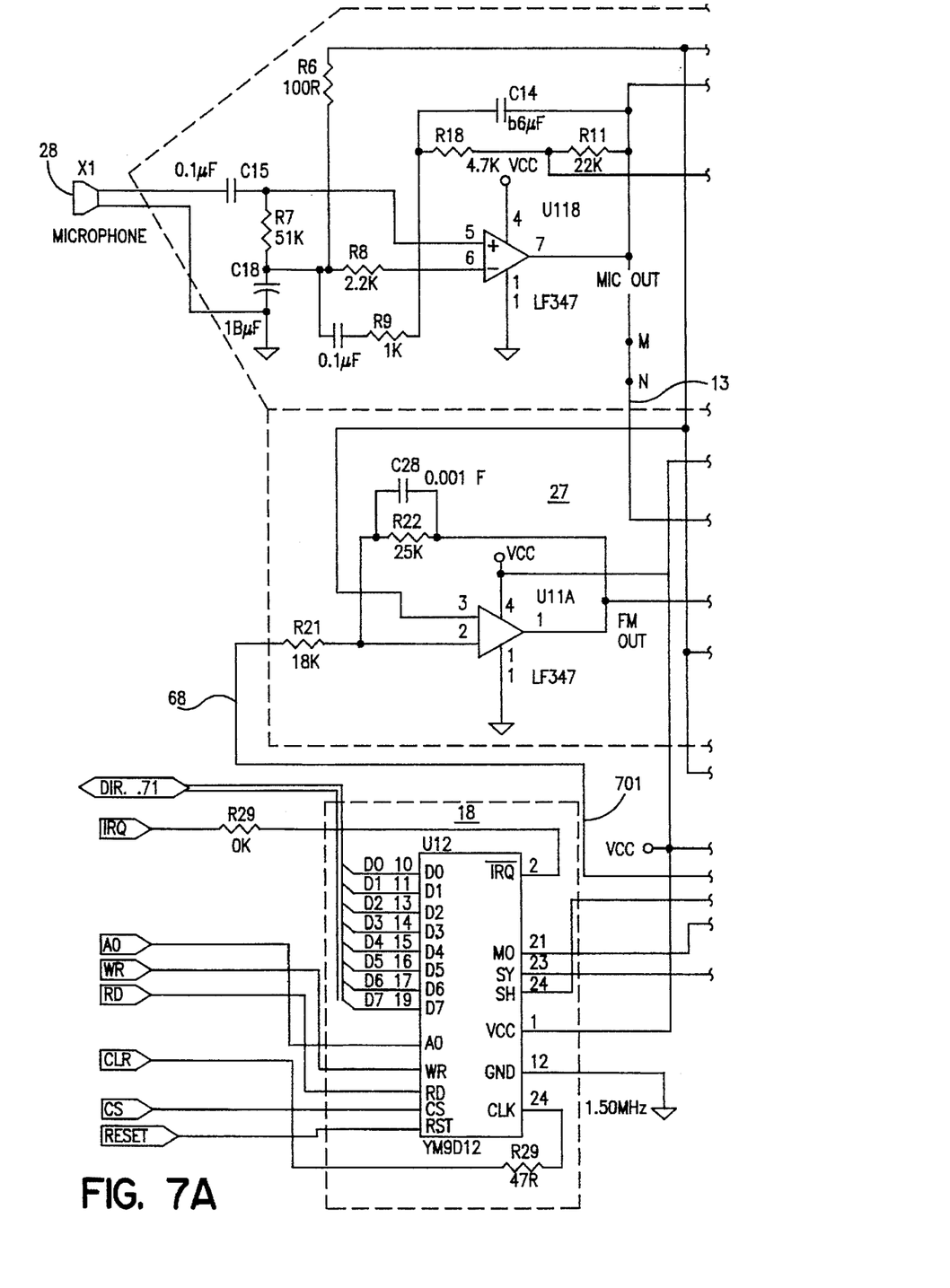
FIG. 7 is a circuit diagram of the microphone, mixer and amplifier sections.
Figure 7B:
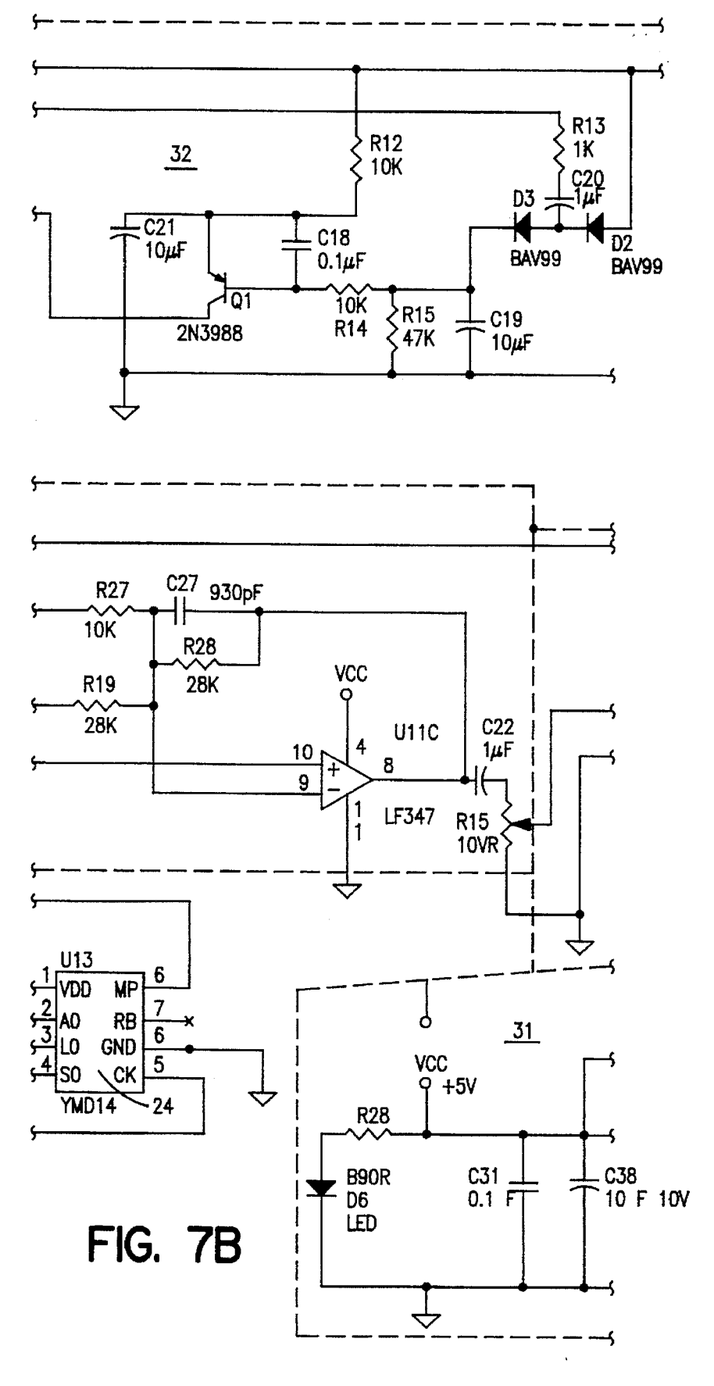
Figure 7C:
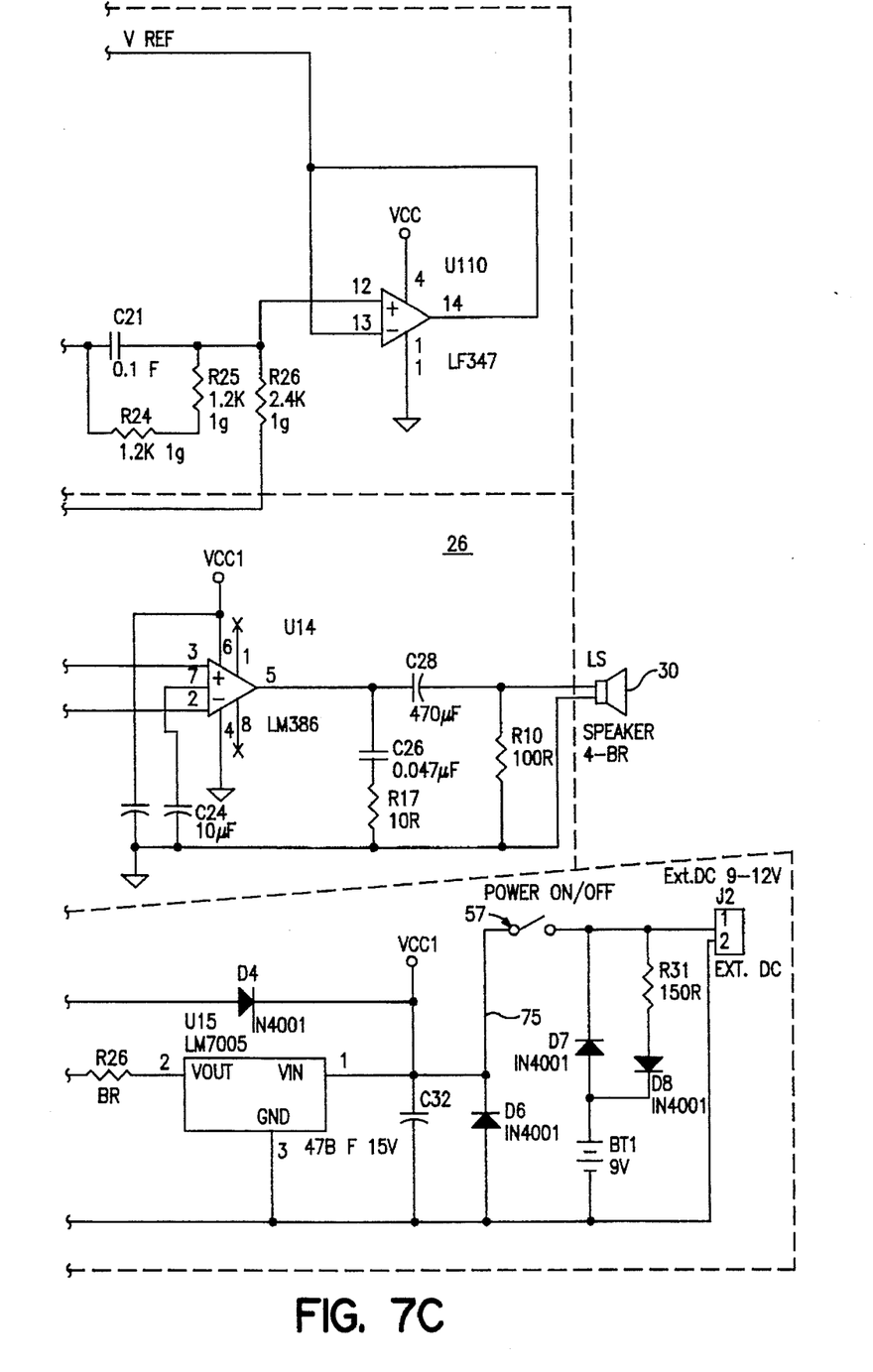

The circuit sections represented by the blocks in the block diagram of FIG. 2 are shown in greater detail in FIGS. 5, 6 and 7.

FIG. 5 shows the replaceable cartridge 12 which includes a ROM memory chip 70. The preferred chip is ATMEL AT27C0 40 which is connected to edge connector 72.

FIG. 6 shows several circuit sections including microprocessor 36 which is an Intel 80C51 operating with a RAM 22 being a Motorola part 6264 according to instructions stored in ROM 20. ROM 20 is a motorola chip SGS 27C64. Housing receptacle 49 is shown which detachably connects to header 72 of the replaceable cartridge 12.

Buffers 25 and 23 interface RAM 22 and CPU 14 and are preferably Motrola 74HC2373 chips.

Section 34 is the circuitry for interfacing with the LCD display through connector 35.

Section 37 is the button control section showing the array of buttons 56 for performing the functions discussed above.

FIG. 7 shows the music synthesizer section 18 operating including a synthesizer chip YAMAHA 3812.

The digitized output from synthesizer chip 18 is applied to D/A converter 24 which is a YAMAHA 3014. The output from D/A converter section 24 is applied to mixer section 27. Voice input to microphone 28 is amplified in section 33. Both the analog music signal from D/A converter chip 72 and the amplified voice signal from section 33 are applied to mixer section 27 and then amplified in section 26. The combined amplified signal is output through speaker 30. The power supply section 31 is shown.

Figure 8A:
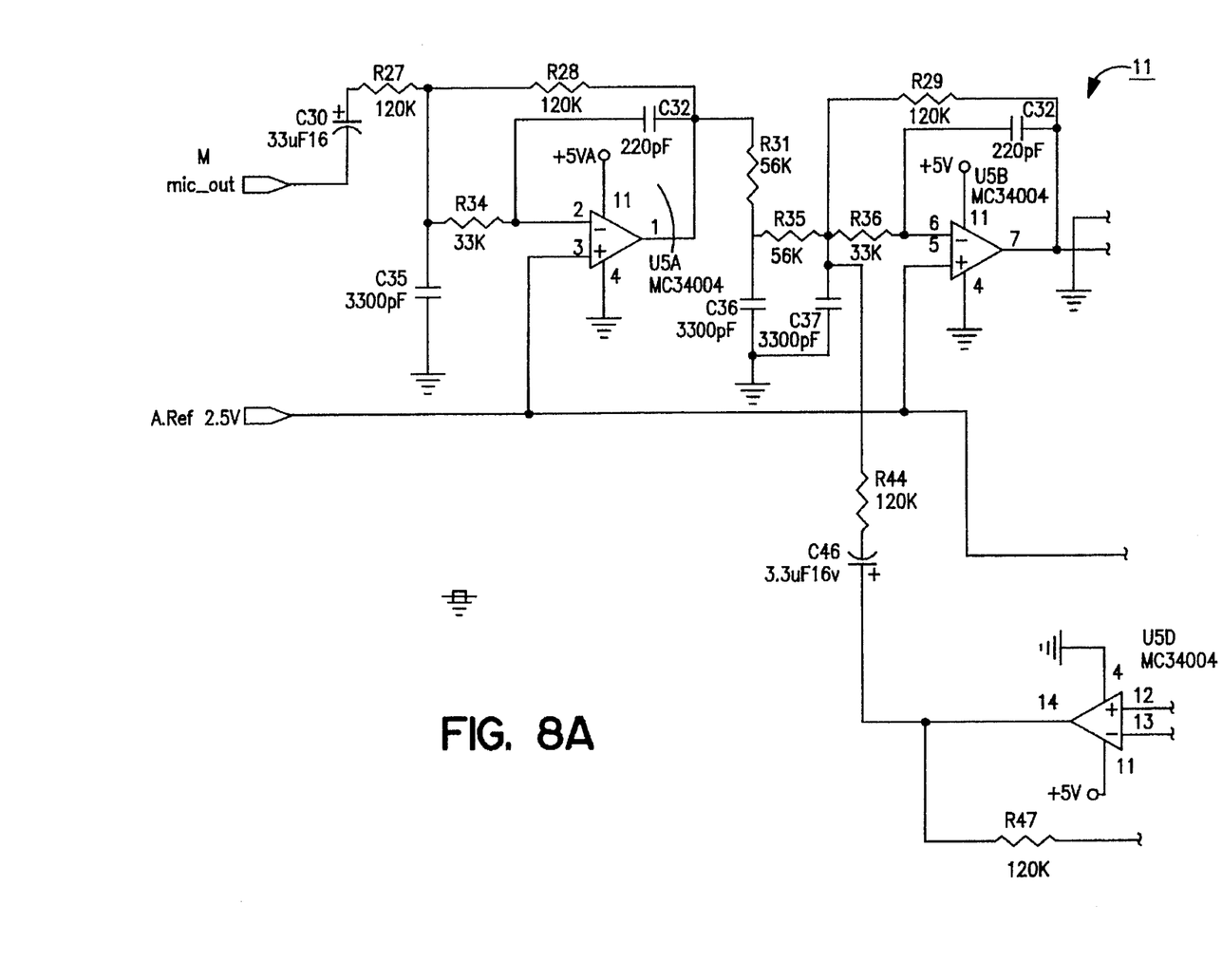
FIG. 8 is a circuit diagram for introducing echo into the musical event.
Figure 8B:
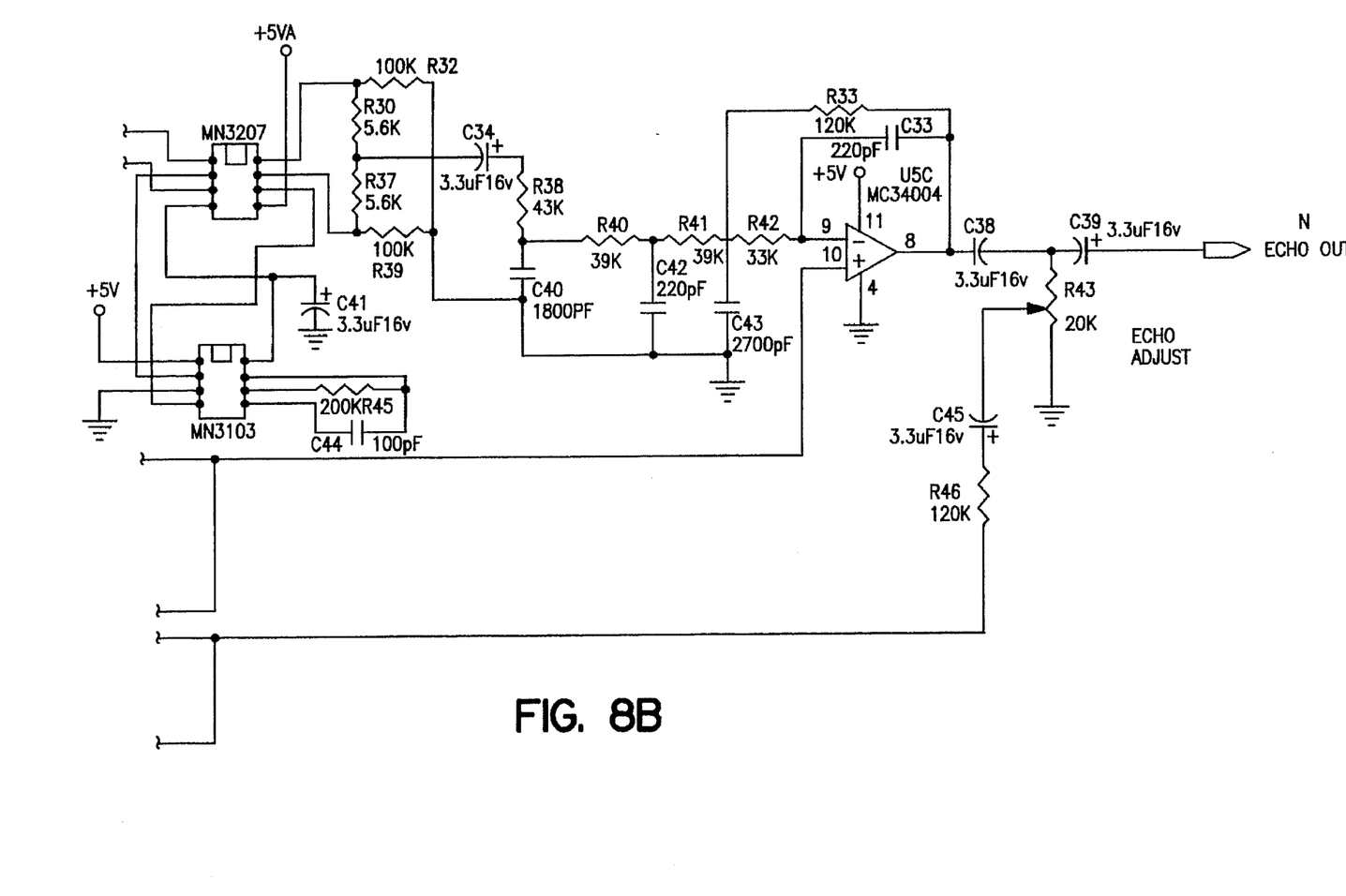

FIG. 8 shows a circuit 11 for adding echo effects to the broadcast musical event. In order to incorporate the echo circuit of FIG. 8 into FIG. 7, in FIG. 7, connector 13 is broken at location M, N and the contacts M, N shown in FIG. 8 are connected to locations M.N respectively in FIG. 7.

Figure 9:
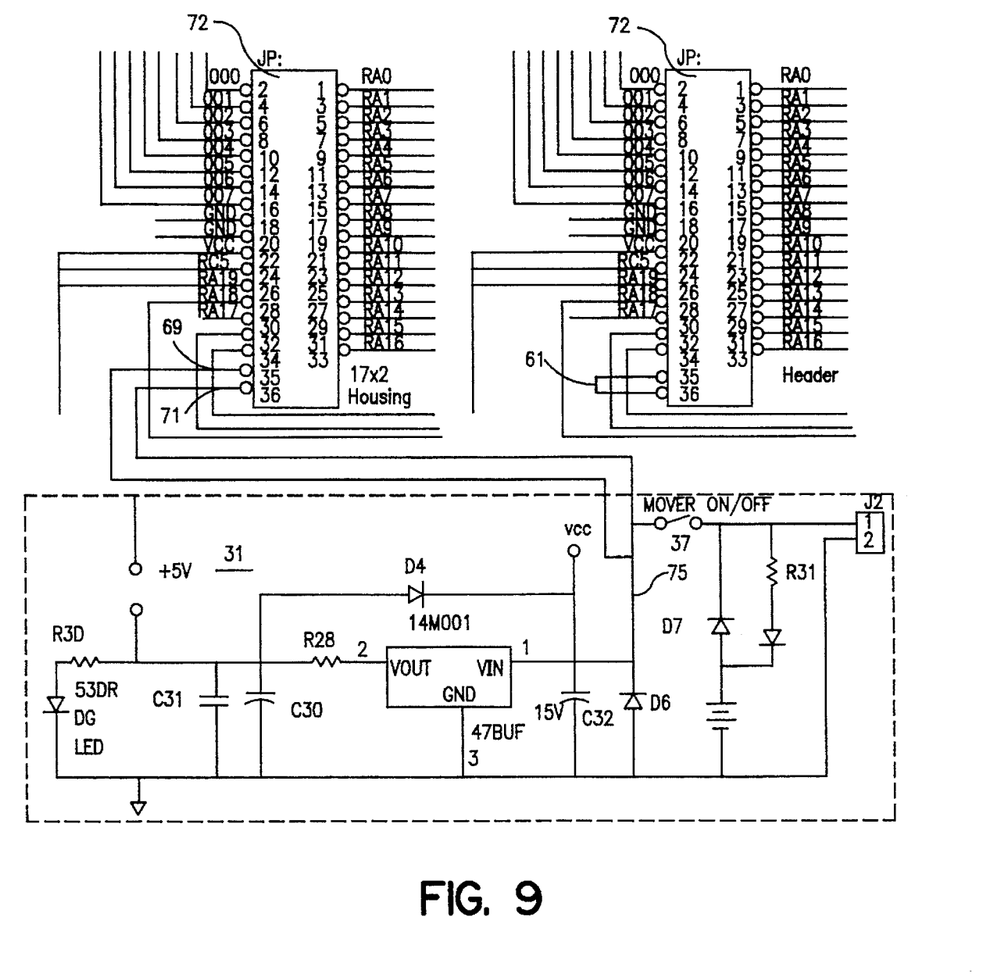
FIG. 9 shows a modified connector for the detachable cartridge.

FIG. 9 illustrates another embodiment showing the connector (header) 72 of ROM cartridge 12 with two pins 35, 36, added. These two pins are shown connected by a (short circuit) loop 61 internal to the connector 72 which mate with terminals 69 and 71 respectively when connector 72 engages housing receptacle 73. Therefore, when housing receptacle 73 engages connector 72, line 75 is closed thereby applying power from supply section 31 to the rest of the device. In this second embodiment represented by the modifications of FIG. 9, the system will not operate unless the modified cartridge of FIG. 9 is plugged into the device.

Variations and modifications of the example of this invention may be contemplated that are within the scope of the invention. For example, the selection of the various components enables the inclusion of all of the sections of the circuit shown in FIG. 2 to be mounted on a single semiconductor substrate (chip) thereby reducing manufacturing costs and enabling adaptability of the device to a design that is conveniently transportable. We therefore wish to define the scope of the invention by the appended claims.

What is claimed is:

1. A karaoke device for presenting a group of musical events which comprises:

means adapted for replaceably connecting a solid state memory cartridge to said device wherein said cartridge has stored therein a succession of commands expressed in a first format;

said succession of commands representing said group of musical events;

a microprocessor having a RAM and adapted for receiving said succession of commands stored in said solid state cartridge;

a ROM connected to said microprocessor and having stored therein a group of subroutines for enabling said microprocessor to instruct a music synthesizer to generate said group of musical events in a second format;

a music synthesizer means connected to said microprocessor for generating said group of musical events expressed as a digital-audio waveform in a second format from said succession of commands in said microprocessor and subroutines stored in said ROM;

a digital to analog convertor means connected to said synthesizer means for converting said digital audio waveform to an analog waveform;

means for connecting said converter means to a speaker to broadcast said analog waveform.

2. A karaoke device as in claim 1 wherein said means for replaceably connecting, said microprocessor, said ROM, said music synthesizer means, said audio processor means, said digital to analog converter means said means for connecting to said speaker are all mounted on one semiconductor substrate.

3. A karaoke device as in claim 1 which comprises a speaker connected to said means for connecting to a speaker.

4. A karaoke device as in claim 1 which comprises a solid state memory cartridge detachably connected to said device wherein said cartridge has stored therein a succession of commands expressed in a first format.

5. The device of claim 1 which comprises:

a microphone means for transforming an audio signal from said user to an accompanying waveform representing a vocal rendition of said musical event;

a mixer means connected to said microphone means and between said speaker means and said converter means for mixing said analog waveform and said accompanying waveform for applying a mix of said accompanying waveform and said analog waveform to said speaker.

6. The karaoke device of claim 1 which comprises:

said ROM having a stored subroutine for separating said succession of commands into a group of lyrical commands and a group of musical commands;

a display control means connected to receive said lyrical commands from said microprocessor and create lyrical signals for display by a lyrical display means;

a lyrical display means for displaying said lyrical signals.

7. The karaoke device of claim 6 wherein:

said display control means is a means for controlling a liquid crystal display means; and said display means is a liquid crystal display means.

8. The karoke device of claim 7 wherein said karaoke device is adapted for being powered by a battery.

9. The karaoke device of claim 1 wherein each one of said group of musical events has a group of titles, one title for each one of said group of musical events stored in said succession of commands and said device comprises:

a title display means for displaying a selected one of said titles;

a key means accessible to a user for enabling said user to register in said microprocessor a selected one of said titles;

said ROM having one of said stored subroutines for directing said microprocessor to display said selected one of said titles.

10. The karaoke device of claim 1 wherein said group of subroutines for modifying each one of said group of commands includes at least one of:

(i) a subroutine to modify musical key and a control switch with which a user can control modification of said musical key;

(ii) a subgroup of subroutines, each subroutine of said subgroup modifying said musical event to include sound of a selected musical instrument, and a control switch means for enabling a user to selected any one of said subroutines of said subgroup;

(iii) a subroutine to modify tempo and a control switch means with which a user is enabled to modify tempo of said musical event.

11. A karaoke device as in claim 1 which comprises means adapted for connecting to a recording means for recording said mixed analog waveform and said accompanying waveforms.

12. The karaoke device of claim 11 which comprises a recording means for recording said mixed analog waveform and said accompanying waveforms.

13. The karaoke device of claim 1 wherein said first format is MIDI format.

14. The karaoke device of claim 5 which comprises an echo circuit means connected to said microphone means for imposing echo effects on said mix of said accompanying waveform and said accompanying waveform.

15. The karaoke device of claim 4 wherein said cartridge has a connector with a plurality of contacts and said device has a receptacle means for detachably receiving said connector and two contacts of said plurality of contacts, being a pair of contacts, are connected to one another and said receptacle means has a pair of terminals which engage respectively said pair of contacts when said receptacle receives said connector such that, when said receptacle is disengaged from said connector, electrical continuity between said pair of contacts is disrupted and said karaoke device is inoperative and when said receptacle is engaged with said connector, with said pair of contacts engaging said pair of terminals respectively, said device is operative.

* * * * *